United States Patent [19]
Treichler et al.

[11] Patent Number: 5,934,615
[45] Date of Patent: Aug. 10, 1999

[54] LUGGAGE BINS WITH ARTICULATING MECHANISM

[75] Inventors: Kurt L. Treichler, Bellingham; Scott G. Jackson, Bow; Siulun Tam, Seattle; Ralph M. Burrows, Bellingham; Jack E. Hart, Bellevue, all of Wash.

[73] Assignee: Hexcel Corporation, Pleasanton, Calif.

[21] Appl. No.: 08/921,451

[22] Filed: Aug. 25, 1997

[51] Int. Cl.[6] ........................................... B64D 11/00
[52] U.S. Cl. .................. 244/118.5; 312/248; 312/266
[58] Field of Search .................. 244/118.5, 118.1, 244/117 R, 119; 312/248, 246, 242, 266, 247

[56] References Cited

U.S. PATENT DOCUMENTS

| | | | |
|---|---|---|---|
| 3,700,199 | 10/1972 | Matuska | 244/118.1 |
| 4,275,942 | 6/1981 | Steidl | 312/266 |
| 4,368,937 | 1/1983 | Palombo et al. | 312/266 |
| 4,799,631 | 1/1989 | Humphries et al. | |
| 4,907,762 | 3/1990 | Bock et al. | |
| 4,947,762 | 8/1990 | Perzl et al. | |
| 5,108,048 | 4/1992 | Chang | |
| 5,129,597 | 7/1992 | Manthey et al. | |
| 5,244,269 | 9/1993 | Harriehausen et al. | 312/247 |
| 5,347,434 | 9/1994 | Drake | |
| 5,383,628 | 1/1995 | Harrichausen et al. | |
| 5,395,074 | 3/1995 | Hart et al. | |
| 5,456,529 | 10/1995 | Cheung | 312/248 |
| 5,549,258 | 8/1996 | Hart et al. | |
| 5,567,028 | 10/1996 | Lutovsky et al. | 312/246 |
| 5,716,027 | 2/1998 | Hart et al. | |

FOREIGN PATENT DOCUMENTS

0614806A1   9/1994   European Pat. Off. .

OTHER PUBLICATIONS

O'Lone Richard G., *Aviation Week & Space Technology*, Apr. 28, 1969, pp. 32 and 33.

*Primary Examiner*—Charles T. Jordan
*Assistant Examiner*—Patricia L. Zuniga
*Attorney, Agent, or Firm*—Christensen O'Connor Johnson & Kindness PLLC

[57] ABSTRACT

Articulating overhead luggage bin assemblies including a luggage bin that it is adapted for mounting to a support structure in a mass transit vehicle, such as an aircraft. The bins have an upper shroud portion, and a lower bucket portion, with cooperating means for interconnecting these two bin portions so that the bucket portion is guided downward and forward relative to the shroud, when the bin is opened. The cooperating means are "rigid" so that each end of the bucket moves in concert with the other, without need for a torque tube or other motion control device linking the bucket ends. The assembly also includes a downlock mechanism for holding the bin in a fully opened position. To close the bin, the downlock mechanism is disengaged by application of backward force to the bucket portion. In a preferred embodiment, the cooperating interconnecting means between the bucket and shroud portions of the bin are "drawer-type guides" that are linear, and consist of nested sheet metal lengths with interposed ball bearings that allow the lengths to move smoothly relative to each other.

15 Claims, 4 Drawing Sheets

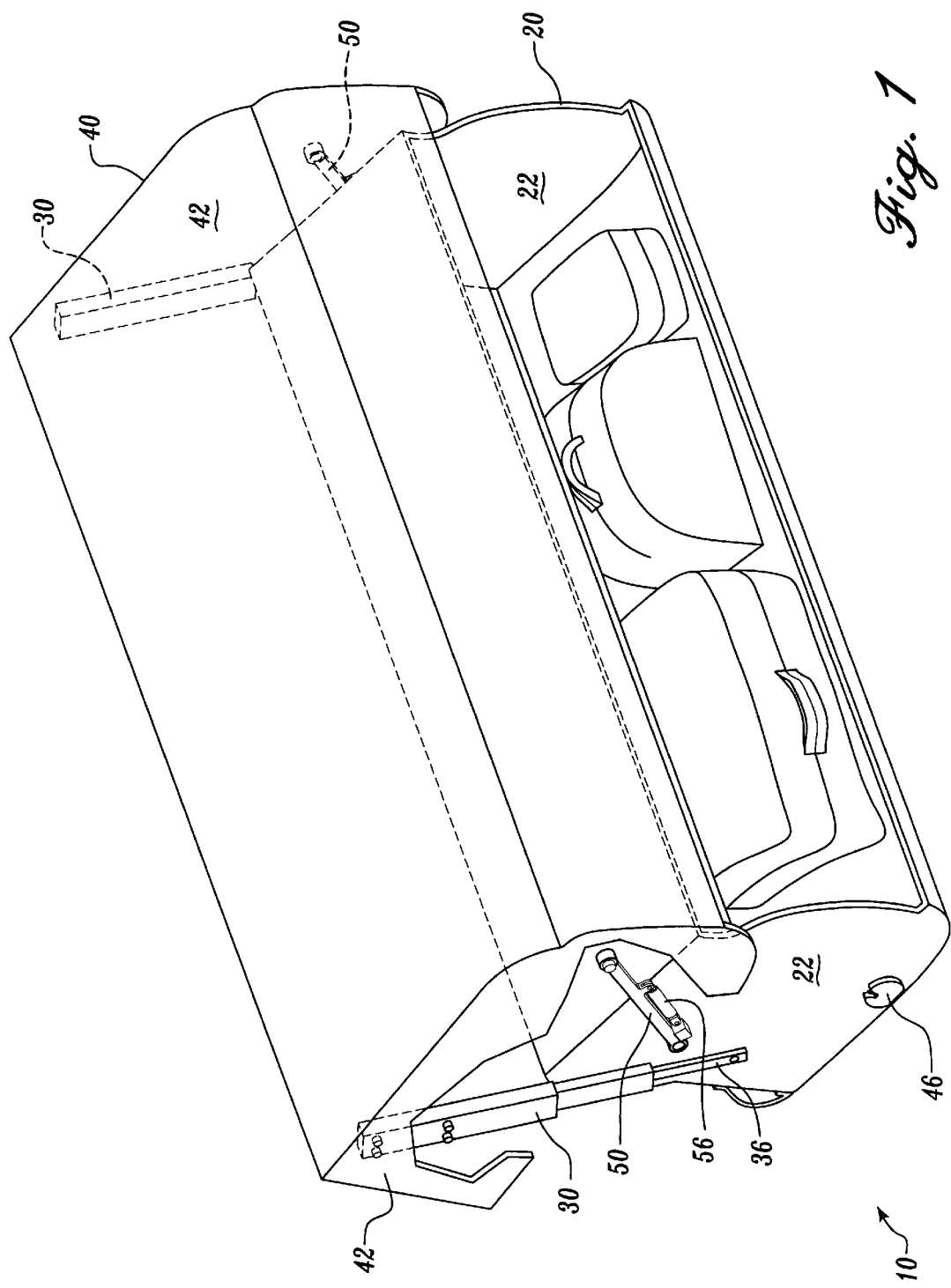

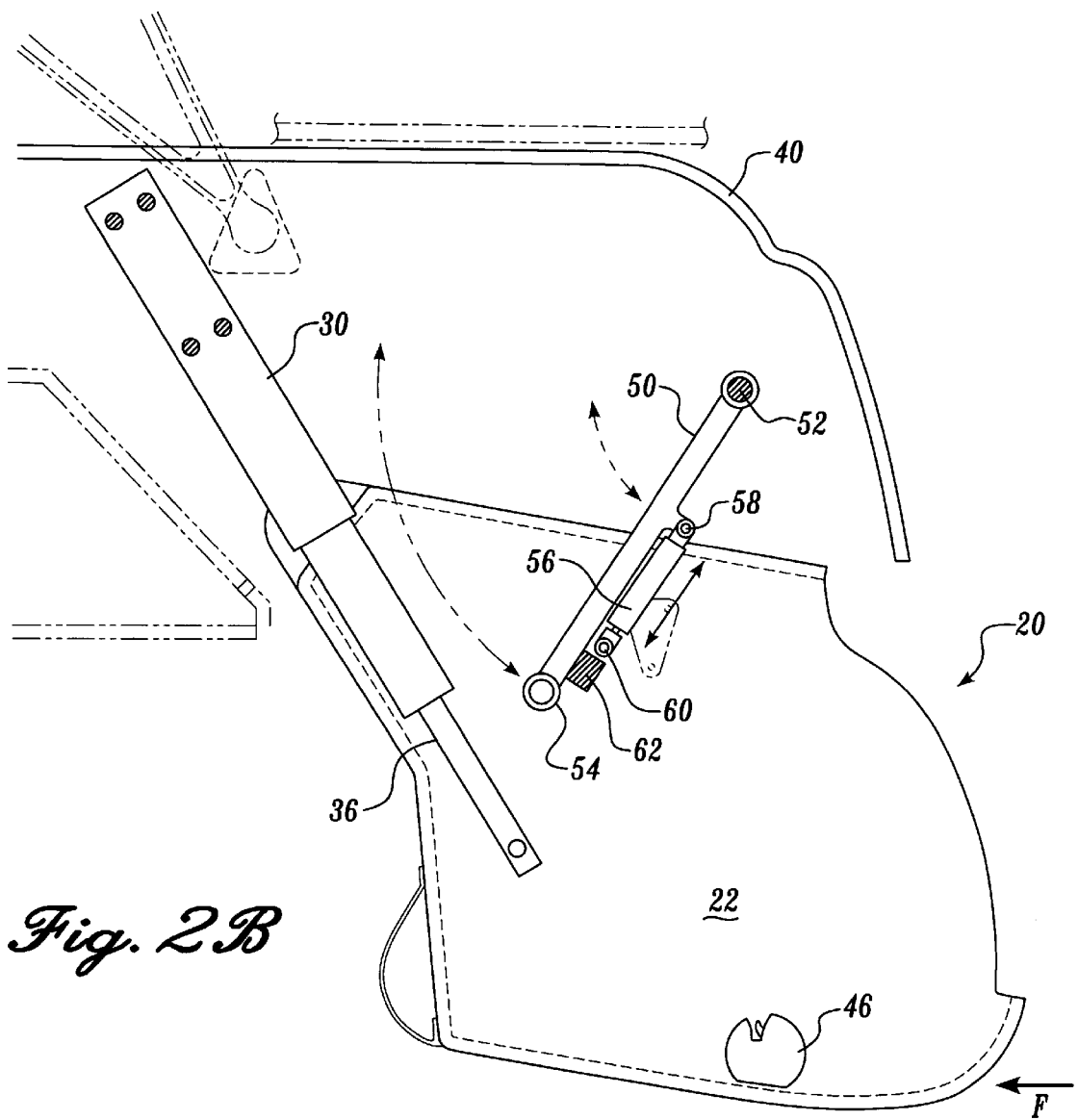
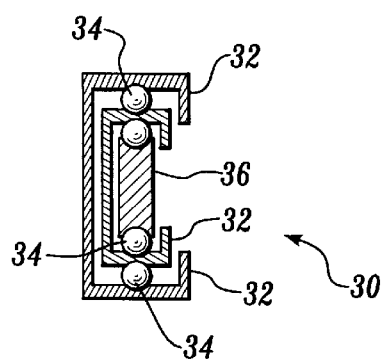

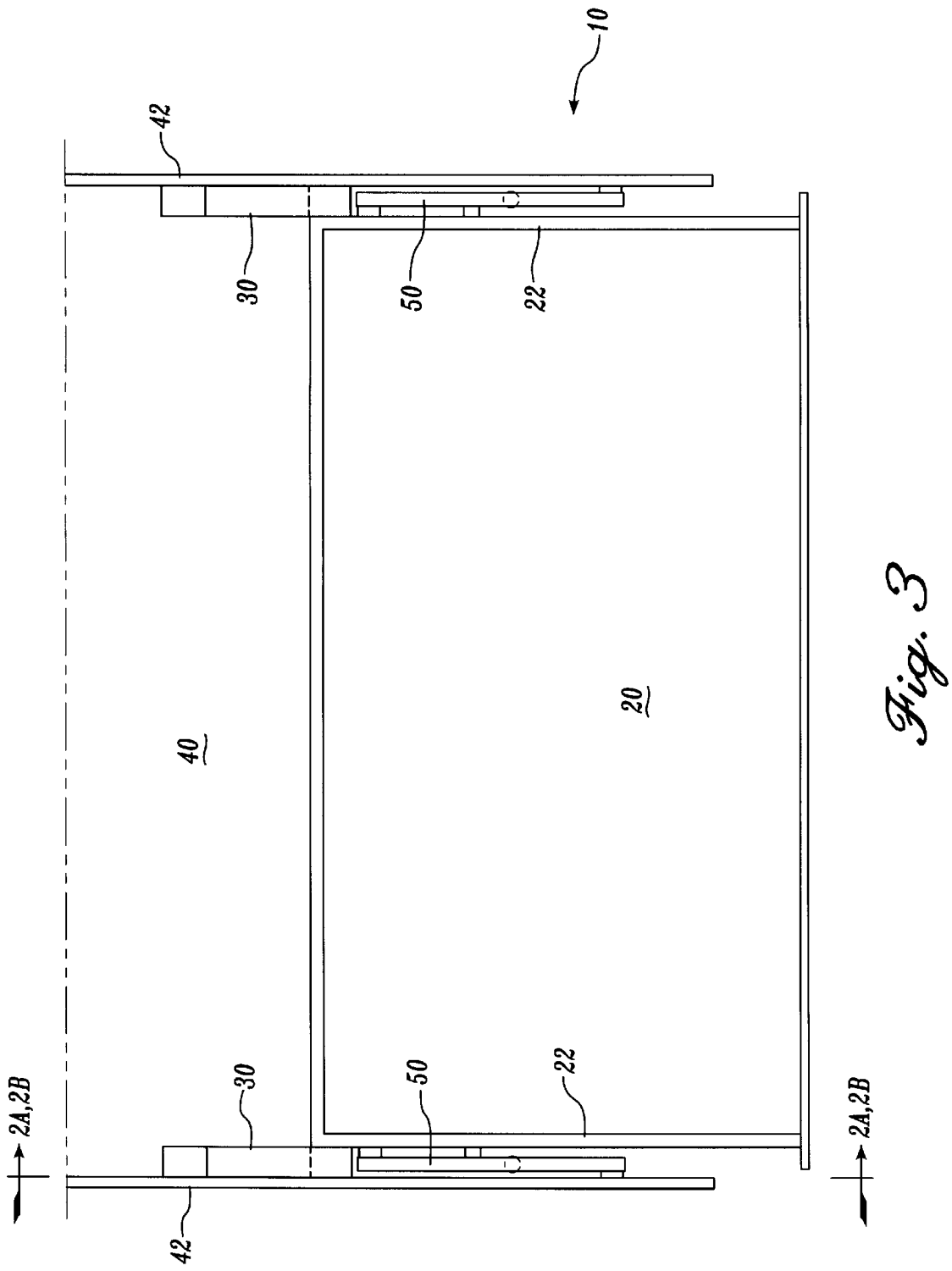

LUGGAGE BINS WITH ARTICULATING MECHANISM

FIELD OF THE INVENTION

The invention relates to luggage bins used for storing carry-on luggage of passengers, in mass transit vehicles such as buses, aircraft, trains, and the like. In accordance with the invention, these overhead luggage stowage bins have an articulating mechanism allowing the bins to open downwardly and forward toward a passenger aisle, thereby facilitating adding and removal of luggage from the bins.

BACKGROUND OF THE INVENTION

Demand for onboard stowage of carry-on luggage has increased, in aircraft as well as other means of mass transit. In the case of aircraft, the provision of additional carry-on luggage stowage capacity is particularly important, because of the limited space available inside an aircraft cabin, and the fact that luggage bins are located overhead. The latter factor is particularly troublesome in that it requires the passenger to lift the luggage into position for storage. This problem is compounded by luggage bins that are located directly over the seats, sometimes requiring the passenger to lean forward over the seats to insert or remove luggage from the bins. Moreover, at the end of a trip, the passenger then has to remove the luggage, which may have shifted during transit, from the same overhead location, which is sometimes awkward.

The increased demand for carry-on luggage capacity provides a motivation for airline operators to retrofit aircraft cabins with larger luggage bins. However, increase in capacity alone does not address the need for passengers to lift their luggage into and out of awkward overhead luggage bins.

There exists a need for overhead carry-on luggage stowage bins that are more accessible to passengers, and that reduce the distance that luggage has to be lifted for storage. Desirably, these bins should also extend outward beyond the seats to allow more easy access, thereby avoiding the need for the passenger to lean forward when placing luggage in the bins. Desirably, the bins should also be designed such that when they are closed, the clearance space between the bin and the seated passengers is not reduced, so that the bins do not contribute towards creating an environment that feels more restrictive to the passenger.

SUMMARY OF THE INVENTION

The invention provides overhead stowage bins, that extend downward and articulate forward when they are opened. These bins, which may be attached as retrofit bins to an existing bin mounting structure, or which may be installed as original equipment, include an upper bin portion ("shroud") adapted for mounting to supports, and a cooperating lower bin portion ("bucket") that opens downward for receiving luggage.

When the luggage bins of the invention are opened, the bucket moves downward, and then translates forward, where it is "locked" into place in the open position. The passenger may then insert or remove luggage from the bucket, with a reduced lift distance. Moreover, depending upon the seat arrangement in the aircraft, the passenger may not have to lean forward, because of the forward translation of the bucket toward the passenger.

In one embodiment, the articulating overhead luggage bin assembly of the invention includes a luggage bin that is adapted for mounting to a support structure in a mass transit vehicle, such as an aircraft. The bin, which has an upper shroud portion and a lower bucket portion, includes cooperating means interconnecting the two bin portions for vertically guiding and forwardly translating the bucket relative to the shroud, when the bin is opened. The cooperating means are "rigid" in the sense of having no (or very limited) play between components so that the means at each end move in concert without need for a torque tube, or other such device, linking the bucket end bulkheads. The bin assembly also includes means for maintaining the bin open, absent application of a horizontal force component urging the bucket backward. The bin assembly further includes at least one device for dampening the rate of downward motion of the bucket when the bin is opened, and for urging the bucket upward into a closed position when it is being closed.

Moreover, the assembly includes a pivotably mounted supporting link at each end of the bucket linking the bucket to an adjacent end bulkhead of the shroud. The link, which is substantially horizontal when the bin is closed, pivots towards a vertical position as the bin is opened. The pivoting motion of the link is arrested by a mechanical stop attached to the shroud end bulkhead.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying not-to-scale schematic drawings, wherein:

FIG. 1 is a perspective view of an embodiment of a bin in accordance with the invention, with the shroud at least partially broken away to better illustrate the articulating bin mechanism;

FIG. 2B is an end view of the preferred embodiment of FIG. 1A, in open configuration, as seen from 2B—2B of FIG. 3;

FIG. 2C is an end cross-sectional view of a preferred drawer-type guide for use in the invention taken at 2C—2C of FIG. 2A; and FIG. 3 is a plan view of the bin of FIGS. 2A and 2B.

DETAILED DESCRIPTION OF THE INVENTION

Figure 2A:
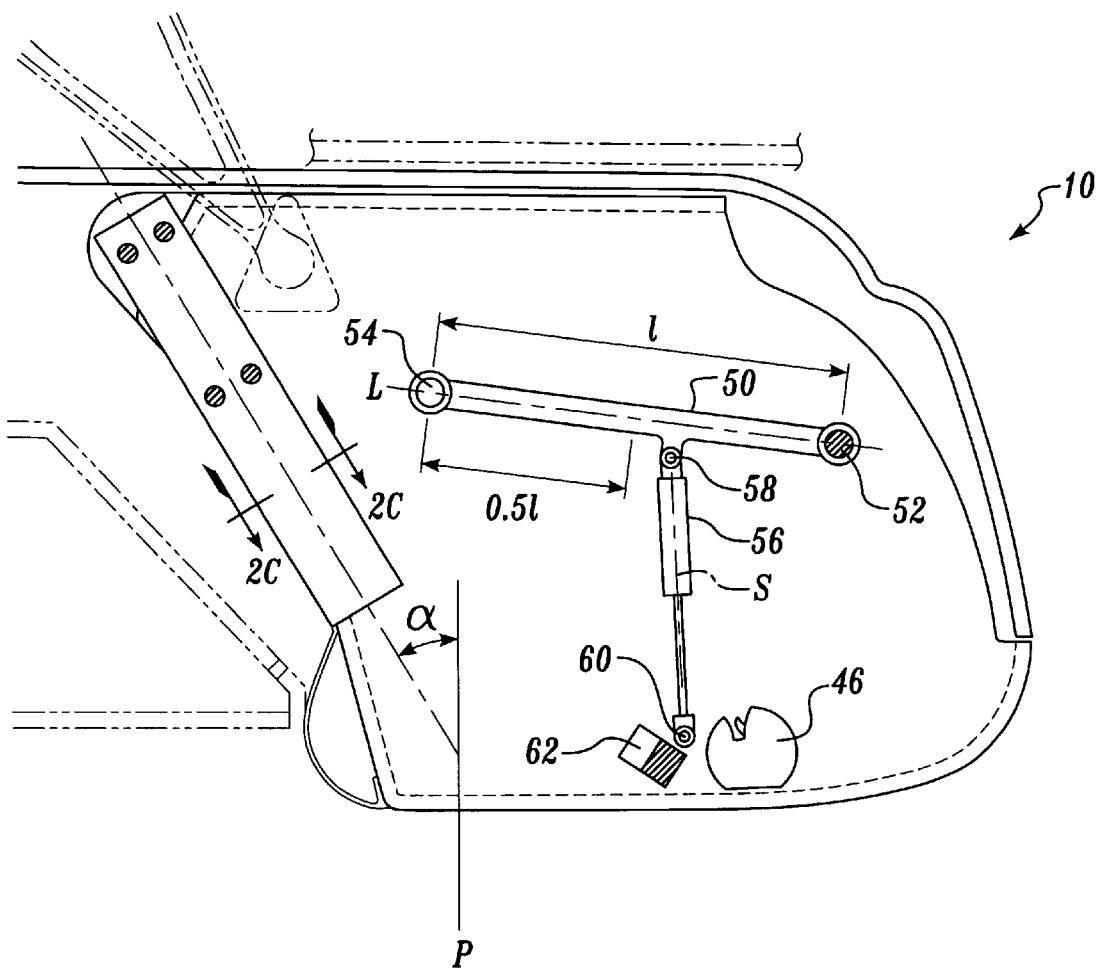
FIG. 2A is an end view of a preferred embodiment of an articulating bin in accordance with the invention, in closed configuration, as seen from 2A—2A in FIG. 3.

In the description of the invention that follows, the term "forward" referring to motion of the bucket of a bin means that, when the bin is mounted as a centerline bin of an aircraft, then the motion is outboard; and when the bin is mounted as a side bin, the motion is inboard. In other words, "forward" means movement of the bin into the aisle space. Conversely, the term "backward" means motion in the opposite direction to "forward".

The invention may be better understood with reference to the accompanying illustrative drawings, which shows a preferred embodiment of the invention.

Referring to FIG. 1, the invention includes a longitudinally extending bin 10 that includes a cooperating upper shroud portion 40 and a lower bucket portion 20 interconnected by latch 46, when the bin is closed. The bucket 20 and shroud 40 are shown in the open position, so that luggage may be inserted or removed from the bucket. In the embodiment shown, the shroud 40 includes a pair of vertical end bulkheads 42. The bucket 20 likewise has a pair of vertical end bulkheads 22 that are disposed adjacent to the end bulkheads 42 of the shroud 40 when the bin is closed.

The unique articulating mechanism of the bins of the invention are disposed at each of the end bulkheads of the bins. The following explanation describes the operation of this mechanism with reference to the preferred embodiment of FIGS. 1, 2A, 2B, 2C, and 3. In this embodiment, a guide 30 is attached to each shroud end bulkhead 42. The guide 30 is preferably of the "drawer guide" type, which includes a linear track formed of nested planar sheet metal lengths 32 with ball bearings 34 interposed between the lengths to allow smooth movement relative to each other, as shown in FIG. 2C. As shown, the track or guide itself is attached to the shroud end bulkhead 42, while the central nested length 36 of the guide has its lower end attached to the adjacent end bulkhead 22 of the bucket 20. Thus, as the bin 10 opens (i.e. the bucket 20 moves downward) the nested metal lengths 32 of guide 30 roll freely relative to each other, while maintaining sufficient overlap between adjacent lengths to maintain rigidity of the guides and eliminate the need for a torque tube or other uniform motion controller between opposite ends of the bin.

The rigidity and linearity of the guides are important aspects of the invention. The preferred linear drawer guides provide smooth motion, and are rigid in the sense of having little (or no) "play" between nested metal lengths. Moreover, the guides 30 at each end of the bin 10 move in concert, regardless of the distribution of weight of normally carried luggage in the bucket. Thus, the bucket's ends can move up (close) and down (open) in concert without need for further uniform motion control linkages between bucket end bulkheads 22, as is required in prior art bins.

Importantly, in accordance with the invention, the linear guide 30 is at an acute α angle to a vertical plane P. Thus, the bucket 20 translates forward as the bin 10 is opened. This feature facilitates placement and removal of luggage from the bucket. Preferably, the guide 30 is inclined at an angle α to the vertical, the angle dependent upon the seating configuration beneath the bin 10, and other physical access factors.

In another important aspect of the invention, the rate of downward motion of the bucket relative to the shroud is retarded by at least one motion dampener, and the extent of downward motion is limited by a mechanical stop. In the preferred embodiment illustrated in the FIGURES, this function of rate dampening is carried out by a longitudinal pivotable link 50 of length l that has one end 52 pivotably attached to an end bulkhead of the shroud 42, and an opposite end 54 pivotably attached to an adjacent end bulkhead 22 of the bucket. Thus, when the bin is closed, the link 50 is substantially (or nearly) horizontal. A spring-loaded or pneumatic strut (or "snubber") 56 extends from the link and has an upper end 58 that is pivotably attached to the link 50, at an "off-center" location of the link, as shown. In other words, the end 58 of the strut is pivotally attached closer to the end 52 of the link (that is attached to the shroud bulkhead 42), than to the other end 54 of the link (which is attached to the bucket bulkhead 22). As explained below, this has important consequences. An opposite end 60 of the strut 56 is attached to the end bulkhead of the bucket 22. Thus, as the bucket is opened, as shown in FIG. 2B, the link pivots counterclockwise until it comes to rest against a stop 62 attached to the shroud end bulkhead. When in this position, the (outward) urging action of the strut 56, shown by arrows in FIG. 2B, is essentially parallel to the longitudinal axis L of the link. (In other words, the longitudinal axis of the strut S is parallel to the axis of the link L.) Moreover, because the strut 56 is attached off-center to the link 50, the strut's urging force provides a downlock which serves to maintain the bucket 20 in an open position, thereby improving safety and facilitating the placement and removal of luggage from the bin. When it is desired to close the bin, force F must be applied horizontally as shown in FIG. 2B, sufficient to move the link 50 clockwise so that the force vector of the strut 56 is no longer parallel to the longitudinal axis L of the link 50. Once this has occurred, the strut's urging force, such as the potential energy of a spring, supplies a force that assists in pivoting the link 50 in a clockwise direction, i.e., assists in closing the bin. This force is particularly useful when the bin is full, since it reduces the amount of force that must be applied physically to close it. Depending upon the size of the bin (i.e. carrying capacity) and the force exerted by a strut, more than one strut may be used to facilitate bin closure by reducing lifting force to be applied, by a passenger or airline personnel.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An articulating overhead luggage bin assembly, comprising:

(a) a bin comprising a lower bin portion cooperating with an upper bin portion to form a luggage containment space, the upper bin portion adapted for mounting to a bin support structure;

(b) rigid cooperating means, interconnected at each end of the bin between an end bulkhead of the upper bin portion and an adjacent end bulkhead of the lower bin portion, for guiding smooth downward and forward articulating motion of the lower bin portion relative to the upper bin portion, so that when the bin is being opened the means guides both ends of the lower bin in concert, wherein the cooperating means for guiding comprises a linear guide, the guide attached to an end bulkhead of the upper bin portion at an acute angle to a vertical plane, with a lower end thereof forward of an upper end thereof; the guide comprising nested lengths of metal, with bearings disposed between adjacent lengths, an innermost of the metal lengths having a lower end attached to the end bulkhead of the lower bin portion; and (c) means for dampening a rate of downward motion of the lower bin portion when the bin is being opened, said means, when the bin is fully open, maintaining the bin in an open position absent application of backward pushing force to the lower bin portion.

2. The bin assembly of claim 1, further comprising means for supporting the lower bin portion, the supporting means comprising a link having one end pivotably attached to an end bulkhead of the upper bin portion, and an opposite end attached to the adjacent lower bin bulkhead.

3. The bin assembly of claim 2, wherein the means for dampening motion comprises a motion dampening strut having one end pivotably attached to an off-center position on the link, and another end of the strut pivotably attached to the adjacent end bulkhead of the lower bin portion and, when the bin is opened, a longitudinal axis of the strut is parallel to a longitudinal axis of the link, so that the strut applies force to maintain the bin in an open position.

4. The bin assembly of claim 3, comprising a link stop attached to the end bulkhead of the upper bin portion, the stop located to arrest further pivotal motion of the link when the bin is fully open.

5. An articulating aircraft overhead luggage bin assembly, the bin assembly comprising:
(a) a bin comprising a lower bin portion and an upper bin portion, the upper bin portion adapted for mounting the bin to aircraft bin support structure;
(b) a rigid linear motion guide extending along an end bulkhead of the upper bin portion, a lower portion of the guide attached to an adjacent end bulkhead of the lower bin portion; and
(c) a downward-motion dampening strut comprising an upper end mechanically communicating with the end bulkhead of the upper bin portion and a lower end attached to the adjacent end bulkhead of the lower bin portion, the strut dampening a rate of downward motion of the lower bin portion when the bin is being opened, and the strut assisting upward motion of the lower bin portion when the bin is being closed.

6. The bin assembly of claim 5, wherein the guide extends at an angle to a vertical plane, so that a lower end of the guide is closer to a front of the bin than an upper end of the guide.

7. The bin assembly of claim 5, further comprising a lower bin supporting link having a longitudinal axis, the link having one end pivotably mounted to the end bulkhead of the upper bin portion and an opposite end pivotably attached to the adjacent end bulkhead of the lower bin portion; and wherein the downward-motion dampening strut comprises an upper end pivotably mounted to said link at a location closer to the one end of the link than the opposite end of the link.

8. The bin assembly of claim 7, wherein when the bin is fully open, the longitudinal axis of the link is parallel to a longitudinal axis of the extendible strut.

9. The bin assembly of claim 7, further comprising a stop attached to the end bulkhead of the upper bin portion, the stop located to arrest pivotal motion of the link, when the bin is fully open.

10. The bin assembly of claim 5, wherein the strut is a spring-loaded strut.

11. An improved overhead luggage bin, of the type having a shroud adapted for mounting to a bin support structure and a cooperating bucket for receiving luggage, wherein, when the bin is being opened, the bucket moves downward and forward relative to the shroud; the improvement comprising:
a pair of guides, one of the pair located at each of opposite end bulkheads of the bin to guide motion of the bucket relative to the shroud, the guides comprising nested lengths of metal with ball bearings disposed between the lengths to allow smooth movement of the lengths relative to each other, said guides providing concerted movement between the opposite end bulkheads of the bin, without requiring another motion controller to produce concerted motion between the end bulkheads.

12. An articulating aircraft overhead luggage bin assembly, the bin assembly comprising:
(a) a bin comprising a lower bin portion and an upper bin portion, the upper bin portion adapted for mounting the bin to aircraft bin support structure;
(b) a rigid linear guide extending along an end bulkhead of the upper bin portion, a lower portion of the guide attached to an adjacent end bulkhead of the lower bin portion, wherein the guide extends at an angle to a vertical plane, so that a lower end of the guide is closer to a front of the bin than an upper end of the guide; and
(c) a downward-motion dampening strut comprising an upper end mechanically communicating with the end bulkhead of the upper bin portion and a lower end attached to the adjacent end bulkhead of the lower bin portion, the strut dampening a rate of downward motion of the lower bin portion when the bin is being opened, and the strut assisting upward motion of the lower bin portion when the bin is being closed.

13. An articulating aircraft overhead luggage bin assembly, the bin assembly comprising:
(a) a bin comprising a lower bin portion and an upper bin portion, the upper bin portion adapted for mounting the bin to aircraft bin support structure;
(b) a rigid linear guide extending along an end bulkhead of the upper bin portion, a lower portion of the guide attached to an adjacent end bulkhead of the lower bin portion;
(c) a downward-motion dampening strut comprising an upper end mechanically communicating with the end bulkhead of the upper bin portion and a lower end attached to the adjacent end bulkhead of the lower bin portion, the strut dampening a rate of downward motion of the lower bin portion when the bin is being opened, and the strut assisting upward motion of the lower bin portion when the bin is being closed; and
(d) a lower bin supporting link having a longitudinal axis, the link having one end pivotably mounted to the end bulkhead of the upper bin portion and an opposite end pivotably attached to the adjacent end bulkhead of the lower bin portion; and wherein the downward-motion dampening strut comprises an upper end pivotably mounted to said link at a location closer to the one end of the link than the opposite end of the link.

14. The bin assembly of claim 13, wherein when the bin is fully open, the longitudinal axis of the link is parallel to a longitudinal axis of the extendible strut.

15. The bin assembly of claim 13, further comprising a stop attached to the end bulkhead of the upper bin portion, the stop located to arrest pivotal motion of the link, when the bin is fully open.

* * * * *